Figure 1:
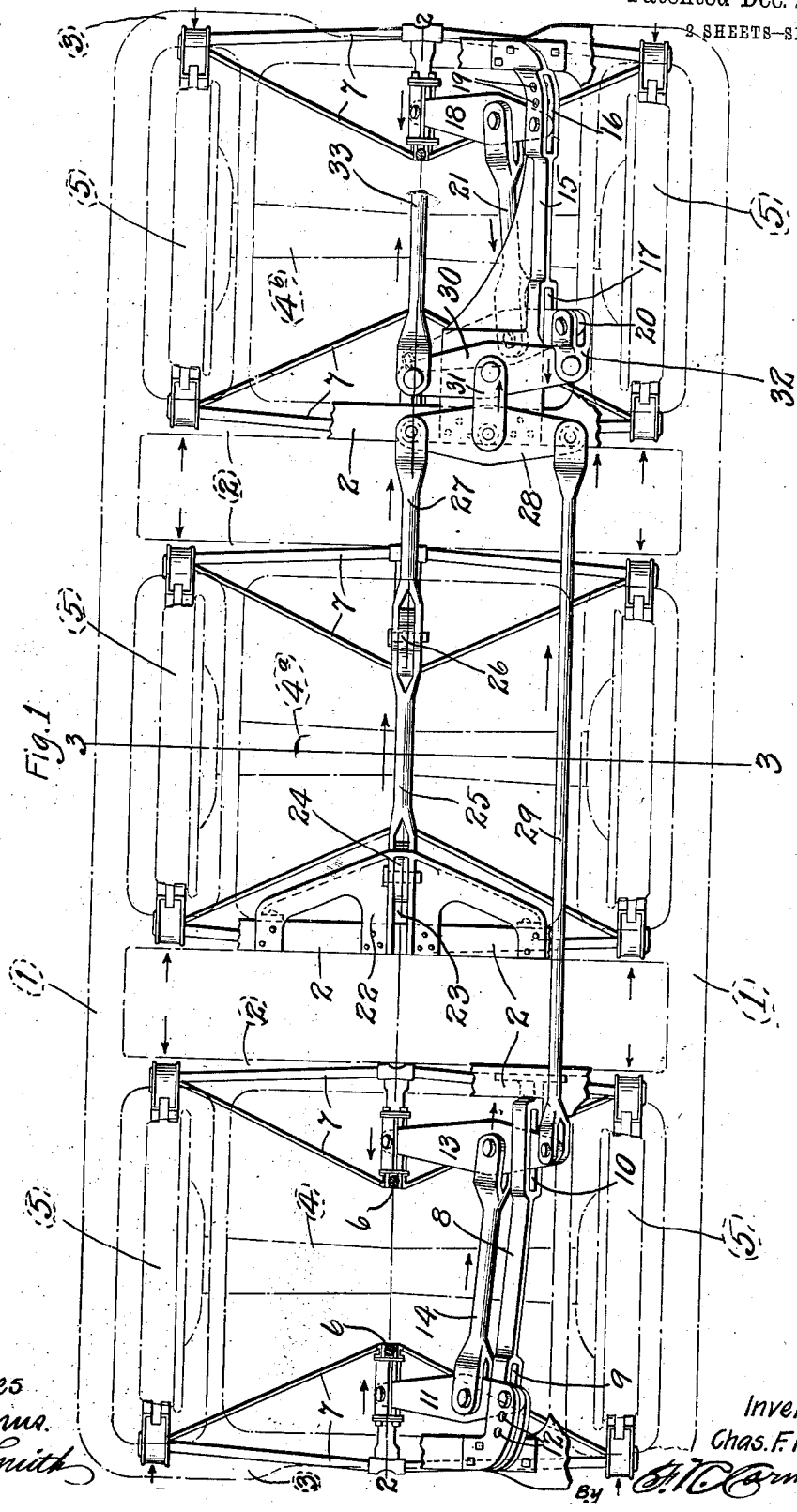

C. F. FREDE.
SIX WHEEL CAR TRUCK BRAKE.
APPLICATION FILED MAR. 21, 1913.
1,080,206.
Patented Dec. 2, 1913.
2 SHEETS—SHEET 2.
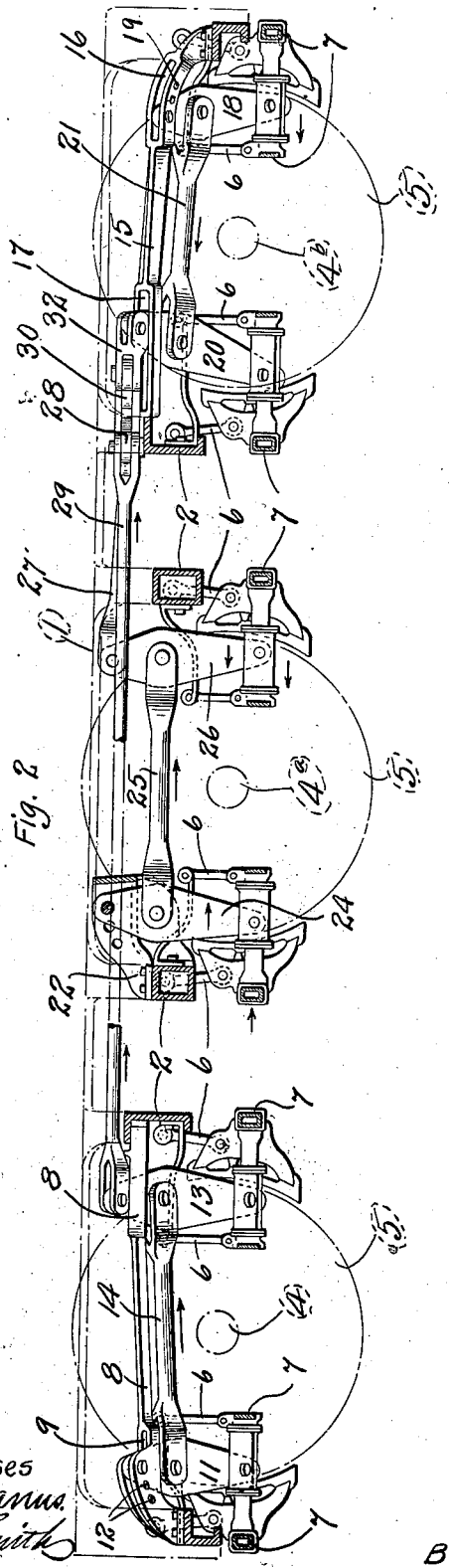
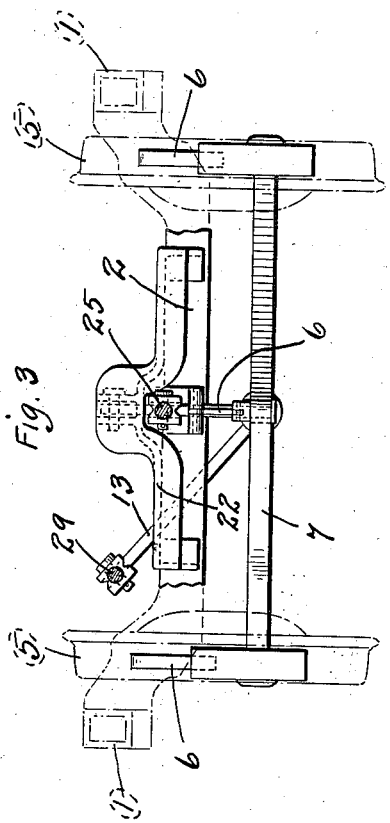
Witnesses
Inventor
Charles F. Frede

UNITED STATES PATENT OFFICE.

CHARLES F. FREDE, OF ST. LOUIS, MISSOURI, ASSIGNOR TO DOUBLE BODY BOLSTER COMPANY, OF ST. LOUIS, MISSOURI, A CORPORATION OF NEW JERSEY.

SIX-WHEEL-CAR-TRUCK BRAKE.

1,080,206.  Specification of Letters Patent.  Patented Dec. 2, 1913.

Application filed March 21, 1913. Serial No. 755,922.

*To all whom it may concern:*

Be it known that I, CHARLES F. FREDE, a citizen of the United States, residing at St. Louis, Missouri, have invented a certain new and useful Improvement in Six-Wheel-Car-Truck Brakes, of which the following is a full, clear, and exact description, such as will enable others skilled in the art to which it appertains to make and use the same, reference being had to the accompanying drawings, forming part of this specification, in which—

Figure 1 is a plan view of the brake rigging of my improved construction, the same being in position for use with the truck frame, axles and wheels shown in dotted lines. Fig. 2 is a sectional view taken approximately on the line 2—2 of Fig. 1. Fig. 3 is a transverse sectional view taken approximately on the line 3—3 of Fig. 1.

My invention relates to new and useful improvements in brake rigging for six wheel car trucks, the principal object of my invention being to provide a simple and efficient brake mechanism having comparatively few parts, and which mechanism is of the clasp type, that is,—a pair of brake beams for each pair of wheels, thus providing a pair of brake shoes for each wheel.

A further object of my invention is to provide a simple form of clasp brake mechanism for six wheel trucks, wherein all the brake levers, brake rods and other parts, with the exception of the brake beams and shoes are located above the axles, and by such arrangement said parts are, to a considerable extent, protected against disarrangement and breakage due to contact with objects such as stones, timbers or the like lying on the right-of-way.

A further object of my invention is, to provide simple means for actuating all the brake levers that are attached to the brake beams, thereby imparting simultaneous and uniform braking movement to the brake beams and the brake shoes carried thereby.

With the above and other objects in view, my invention consists in certain novel features of construction and arrangement of parts hereinafter more fully described and claimed.

Referring by numerals to the accompanying drawings, 1 designates the wheel pieces of the truck frame, 2 the transoms thereof, 3 the end rails, 4, 4ª and 4ᵇ the axles, and 5 the wheels carried thereby. Arranged on opposite sides of the axles and suspended from the truck frame by suitable hangers or links 6 are brake beams 7 provided on their ends with the usual heads and shoes, which latter are adapted to engage on opposite sides of the wheels 5. Fixed to the end rail and transom of the truck frame adjacent to the axle 4 is a longitudinally disposed rail or bracket 8 provided near its ends with slots 9 and 10. Positioned in the slot 9 and pivotally connected to the bracket 8 is the upper end of a lever 11, the lower end of which is pivotally connected to the strut of the corresponding brake beam. The walls of the bracket 8 to the sides of the slot 9 are provided with a series of coinciding apertures 12, thus permitting the upper end of the lever 11 to be pivotally connected to said bracket at different points. The upper portion of a brake lever 13 projects through and is loosely seated in the slot 10, and the lower end of this lever is pivotally connected to the corresponding brake beam. Pivotally connected to the levers 11 and 13 and arranged above the axle 4 is a rod 14.

Rigidly fixed to the transom and end rail of the truck frame above and adjacent to the axle 4ᵇ is a longitudinally extending rail or bracket 15 provided near its ends with slots 16 and 17. Positioned in the slot 16 and pivotally connected to the rail or bracket 15 is the upper end of a lever 18, the lower end of which is pivotally connected to the corresponding one of the brake beams 7. The walls of the bracket 15 to the sides of the slot 16 are provided with a series of alined apertures 19 in order that the upper end of the lever 18 may be adjustably connected to the rail or bracket 15. Extending through and loosely seated in the slot 17 is a lever 20, the lower end of which is pivotally connected to the corresponding one of the brake beams 7, and pivotally connected to this lever 20 and the lever 18 are the ends of a rod 21 which is preferably located above the axle 4ᵇ.

Fixed to one of the transoms of the truck frame adjacent to the center axle 4ª is a bracket 22 provided with a vertically disposed, longitudinally extending slot 23, and positioned in this slot and pivotally connected to said bracket is the upper end of a lever 24, the lower end of which is pivotally connected to the corresponding one of the brake beams 7. The walls of the bracket 22 to the sides of the slot 23 are provided with a series of apertures arranged in pairs, whereby the upper end of the lever 24 may be adjustably connected to said bracket. Pivotally connected to the lever 24 is one end of a rod 25, the opposite end of which is pivotally connected to a lever 26, which latter is located on the opposite side of the axle $4^a$ from the lever 24. The lower end of this lever 26 is pivotally connected to the corresponding one of the brake beams 7. Pivotally connected to the upper end of the lever 26 is one end of a rod 27, the opposite end of which is pivotally connected to one end of a horizontally disposed lever 28. This lever 28 is positioned above the inner end of the bracket or rail 15, and pivotally connected to said lever 28 is one end of a rod 29, the opposite end of which is pivotally connected to the upper end of the lever 13. Arranged above the inner end of the bracket or rail 15 adjacent to the lever 28 is a horizontally disposed lever 30, the central portion of which is connected to the lever 28 by a link 31. One end of the lever 30 is connected to the upper end of the lever 20 by a link 32, and the opposite end of said lever 30 is pivotally connected to one end of a rod 33 which extends to and is directly connected to the piston rod of the air brake cylinder (not shown).

The operation of my improved brake mechanism is as follows: When the brake rod 33 is drawn in the direction indicated by the arrow in Fig. 1 the lever 30 will be moved in the same direction, likewise moving the lever 28 and the rods 27 and 29 connected thereto. At the same time the lever 30 is moved in the direction of the pull upon the rod 33 it fulcrums upon its point of pivotal connection with the link 31, thus moving the link 32 and the upper end of the lever 20 in a direction opposite to that of the rod 33. This movement of the lever 20 is transmitted to the lever 18 through the rod 21, and as a result, said lever 18 swings on its fulcrum, which is the point of pivotal connection between said lever and the bracket 15, and as a result, the lower end of said lever moves the brake beam to which it is connected, and the shoes on the ends of this brake beam are caused to engage the peripheries of the wheels 5 upon the axle $4^b$. As the lever 20 is actuated in this movement it will swing upon its fulcrum, which is the point of pivotal connection with the rod 21, and as a result, the brake beam to which the lower end of the lever 20 is connected will be moved so that the brake shoes on the ends of this particular beam are brought into contact with the wheels 5 on the axle $4^b$. The movement imparted to the rod 27 swings the lever 26 upon its fulcrum, which is the point of pivotal connection with the rod 25, and as a result, the shoes on the ends of the beam to which the lower end of the lever 26 is connected will be brought into contact with the wheels on the axle $4^a$. The movement of the rod 27 is transmitted to the rod 25 through the lever 26, and as a result, the lever 24 is moved upon its fulcrum, which is the point of pivotal connection with the bracket 22, and as a result, the shoes on the ends of the brake beam connected to said lever 24 will be drawn into contact with the peripheries of the wheels on the axle $4^a$. The movement of the rod 29 is transmitted directly to the lever 13, and from thence through rod 14 to lever 11, and as these levers are moved upon their fulcrums, the brake beams to which the lower ends of said levers are connected will be moved toward each other, and as a result, the shoes carried by said brake beams will be brought into contact with the peripheries of the wheels upon the axle 4. It will be understood that the movements just described occur simultaneously as the brake rod 33 is actuated, and as a result, the respective pairs of brake beams will be moved toward each other so that the brake shoes carried by said brake beams will clasp or engage on opposite sides of the wheels to exert braking action.

In many types of six wheel car trucks brake beams are applied only on one side of each pair of wheels, and it has been found in practice that where such construction is employed, the constant application of the brakes against the wheels from one side results in uneven wear and disarrangement of the journals or axle bearings, consequently resulting in frequent repairs and renewals. My improved arrangement of clasp brakes, the shoes of which engage on opposite sides of the wheels, overcomes the objections above noted inasmuch as the pressure of the braking action is applied equally to both sides of the wheels, thereby relieving the journals of undue and uneven strains.

My improved brake rigging consists of comparatively few parts, and therefore said rigging is not liable to easily get out of order. Furthermore, by arranging practically all of the levers and rods of the rigging above the axles, these parts are not liable to become disarranged or broken as a result of contact with objects lying on the right-of-way.

It will be readily understood that minor changes in the size, form and construction of the various parts of my improved brake rigging can be made and substituted for those herein shown and described without departing from the spirit of my invention, the scope of which is set forth in the appended claims.

I claim:

1. A brake rigging for six wheeled trucks, comprising brake beams arranged in pairs on opposite sides of the wheels of the truck, levers each pivotally connected to a certain one of the break beams of each pair at one end, and pivotally connected to fixed parts of the truck at their opposite ends, a floating lever pivotally connected to the other brake beam of each pair, a rod connecting each pair of levers, and means connected to all of the floating levers for simultaneously imparting movement thereto.

2. In a six wheel car truck, the combination with brake beams arranged in pairs on opposite sides of the truck wheels, of levers pivotally connected to said brake beams, one lever of each pair being fulcrumed to a fixed part of the truck frame, a rod connecting each pair of levers, and means for simultaneously imparting uniform movement to all of the levers.

3. In a six wheel car truck, the combination with brackets fixed to the truck frame, of levers fulcrumed to said brackets, floating levers arranged in pairs with the first mentioned levers, connections between each corresponding pair of levers, brake beams pivotally connected to said levers, which brake beams are arranged on opposite sides of the truck wheels, and connections to said floating levers for simultaneously imparting movement thereto.

4. The combination with a six wheeled truck, of brackets fixed to the truck frame, levers fulcrumed to said brackets, floating levers arranged in pairs with said first mentioned levers, connections between the pairs of levers, brake beams pivotally connected to said levers and arranged in pairs on opposite sides of the truck wheels, and connections including rods and equalizing levers for simultaneously imparting uniform movement to the floating levers.

5. A brake rigging for six wheeled trucks comprising brake beams arranged in pairs on opposite sides of the wheels, levers pivotally connected to said brake beams, brackets on the truck frame to which the upper end of one of each pair of levers is fulcrumed, certain of which brackets are slotted to form bearings for certain of the levers, a rod connecting each pair of levers, a power-actuated rod, and connections between said power-actuated rod and certain of the levers whereby corresponding movement is simultaneously imparted to all of the brake levers and the brake beams carried thereby.

6. A brake rigging for six wheeled trucks comprising levers arranged in pairs and pivotally connected to the brake beams, one lever of each pair being pivotally connected to a corresponding bracket, a connecting rod between each pair of levers, a pair of floating equalizing levers, connections between said equalizing levers and certain of the brake levers, and means for applying power to one of the floating equalizing levers.

7. The combination with a six wheeled truck frame having end rails and transoms, of brackets fixed to said end rails and transoms, which brackets are provided with slots, brake beams arranged in pairs on opposite sides of the truck wheels, levers pivotally connected to said brake beams, certain of which levers are fulcrumed in certain of the slots of the brackets, the remaining levers being loosely positioned in the remaining slots in the brackets, and means for simultaneously imparting uniform movement to all the levers.

8. The combination with a six wheeled truck frame having end rails and transoms, of brackets fixed on said end rails and transoms, which brackets are provided with slots, brake beams arranged in pairs on opposite sides of the truck wheels, levers pivotally connected to said brake beams, which levers bear in the slots in the brackets, and means including rods and equalizing levers connected to said first mentioned levers for simultaneously imparting uniform movement thereto.

In testimony whereof I hereunto affix my signature in the presence of two witnesses, this 14th day of March, 1913.

CHARLES F. FREDE.

Witnesses:
  HAL C. BELLVILLE,
  FRED. H. BLANKENBORN.